United States Patent
Cheng

(10) Patent No.: US 8,616,632 B2
(45) Date of Patent: Dec. 31, 2013

(54) CHILD SAFETY SEAT AND TETHER THEREOF

(75) Inventor: Kenny Cheng, Taipei (TW)

(73) Assignee: Wonderland Nurserygoods Company Limited, Hong Kong (HK)

(*) Notice: Subject to any disclaimer, the term of this patent is extended or adjusted under 35 U.S.C. 154(b) by 0 days.

(21) Appl. No.: 13/343,292

(22) Filed: Jan. 4, 2012

(65) Prior Publication Data

US 2012/0181828 A1    Jul. 19, 2012

Related U.S. Application Data

(60) Provisional application No. 61/433,972, filed on Jan. 19, 2011.

(51) Int. Cl.
  *B60N 2/42* (2006.01)
  *B60R 21/00* (2006.01)
  *B60R 22/00* (2006.01)

(52) U.S. Cl.
  USPC ...................................... 297/216.11; 297/471

(58) Field of Classification Search
  USPC ..................... 297/216.11, 471, 472
  See application file for complete search history.

(56) References Cited

U.S. PATENT DOCUMENTS

| | | | | |
|---|---|---|---|---|
| 2,443,191 A | * | 6/1948 | Miller | 297/471 |
| 4,099,770 A | * | 7/1978 | Elsholz et al. | 297/216.11 |
| 5,265,931 A | * | 11/1993 | Ryan | 297/130 |
| 5,695,243 A | * | 12/1997 | Anthony et al. | 297/250.1 |
| 6,450,576 B1 | * | 9/2002 | Rhein et al. | 297/250.1 |
| 6,619,752 B1 | | 9/2003 | Glover | |
| 2004/0095004 A1 | | 5/2004 | Horton et al. | |
| 2007/0210639 A1 | | 9/2007 | Berger et al. | |
| 2010/0109215 A1 | | 5/2010 | Ruthinowshi et al. | |
| 2010/0293759 A1 | | 11/2010 | Wada | |

FOREIGN PATENT DOCUMENTS

EP    1262383 A2    4/2002
WO    2005058635 A1    3/2005

* cited by examiner

*Primary Examiner* — Milton Nelson, Jr.
(74) *Attorney, Agent, or Firm* — David I. Roche; Baker & McKenzie LLP

(57) ABSTRACT

A child safety seat comprises a backrest, a seat portion connected with a lower end portion of the backrest, and a tether including a strap held with the child safety seat, and a resilient member assembled with the strap. The resilient member and the strap have different elasticity, and a tensioning of the strap causes deformation of the resilient member. When the vehicle is subject to a frontal collision or suddenly brakes, the resilient member can deform to cushion the retaining force applied by the tether, which can reduce the risk of injuries.

20 Claims, 14 Drawing Sheets

CHILD SAFETY SEAT AND TETHER THEREOF

CROSS-REFERENCE TO RELATED APPLICATION(S)

This application claims priority to U.S. Provisional Patent Application No. 61/433,972 filed on Jan. 19, 2011.

BACKGROUND

1. Field of the Invention

The present invention relates to tethers used in child safety seats.

2. Description of the Related Art

A child safety seat is usually provided with a restrain harness that allows to hold the child in place and protect the child against collision of the vehicle. Moreover, certain child safety seats can also include an additional top tether comprised of a strap that can extend behind the child safety seat to attach with a fixed anchor point provided on the vehicle. When the vehicle is subject to a frontal crash or suddenly brakes, the tether can prevent the top of the child safety seat to move forward, which can reduce the head excursion of the child and reduce the risk of injury. This design of the tether is, however, unable to absorb shock and provide a progressive retaining force in case of collision. Accordingly, there may still be safety concerns.

Therefore, the child safety seat needs a tether design that is safer and address at least the foregoing issues.

SUMMARY

The present application describes a child safety seat and a tether adapted for use with the child safety seat. In some embodiment, the child safety seat includes a backrest, a seat portion connected with a lower end portion of the backrest, and a tether including a strap and a resilient member. The strap is held with the child safety seat, and the resilient member is assembled with the strap. The resilient member and the strap have different elasticity, and a tensioning of the strap causes deformation of the resilient member.

In other embodiments, a tether adapted for use a child safety seat is described. The tether includes a strap held with the child safety seat, and a resilient member connected with the strap, wherein the resilient member and the strap have different elasticity, and a tensioning of the strap causes deformation of the resilient member.

The foregoing is a summary and shall not be construed to limit the scope of the claims. The operations and structures disclosed herein may be implemented in a number of ways, and such changes and modifications may be made without departing from this invention and its broader aspects. Other aspects, inventive features, and advantages of the invention, as defined solely by the claims, are described in the non-limiting detailed description set forth below.

DETAILED DESCRIPTION OF THE EMBODIMENTS

Figure 1:
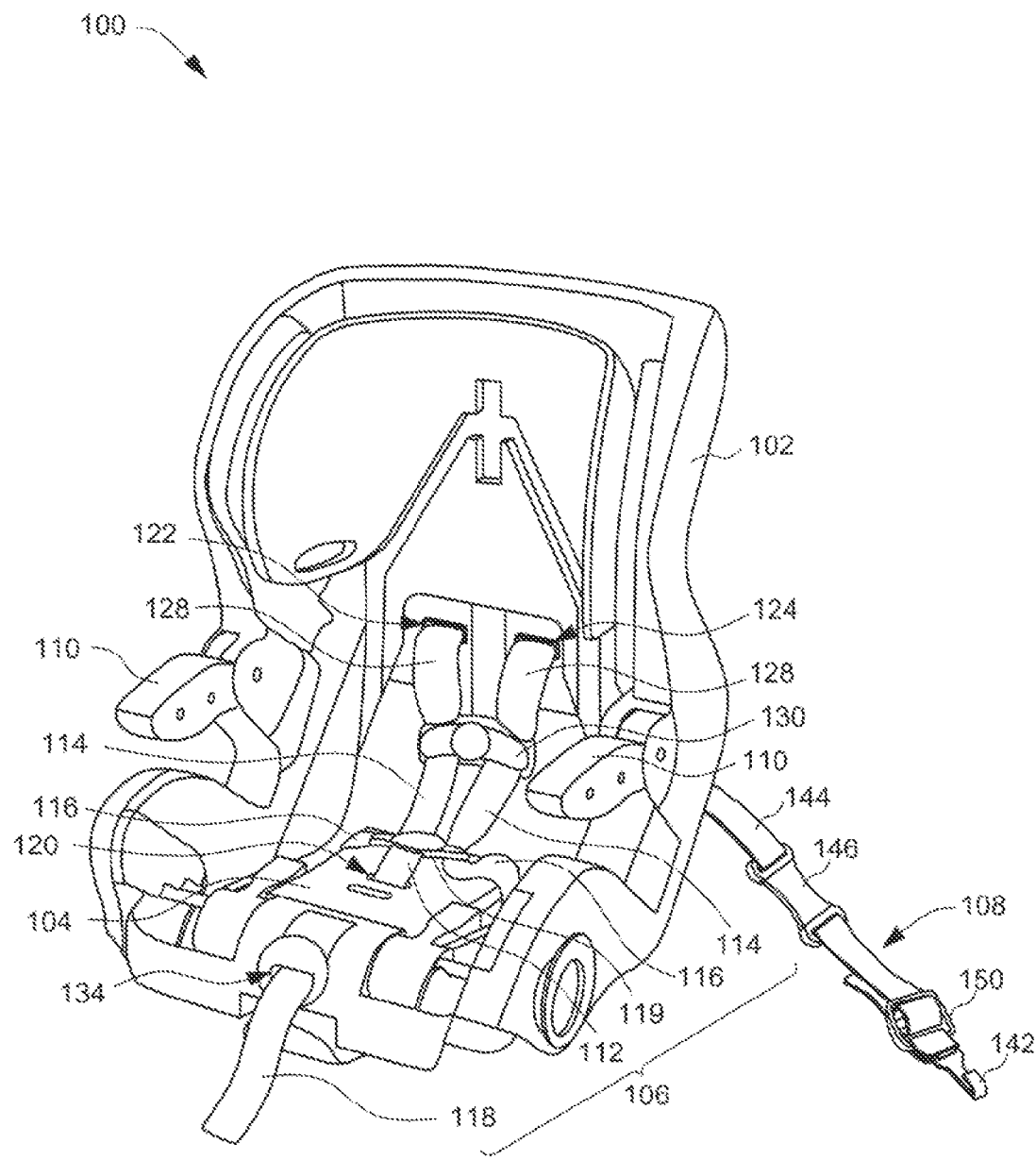
FIG. 1 is a perspective view illustrating one embodiment of a child safety seat.
Figure 2:
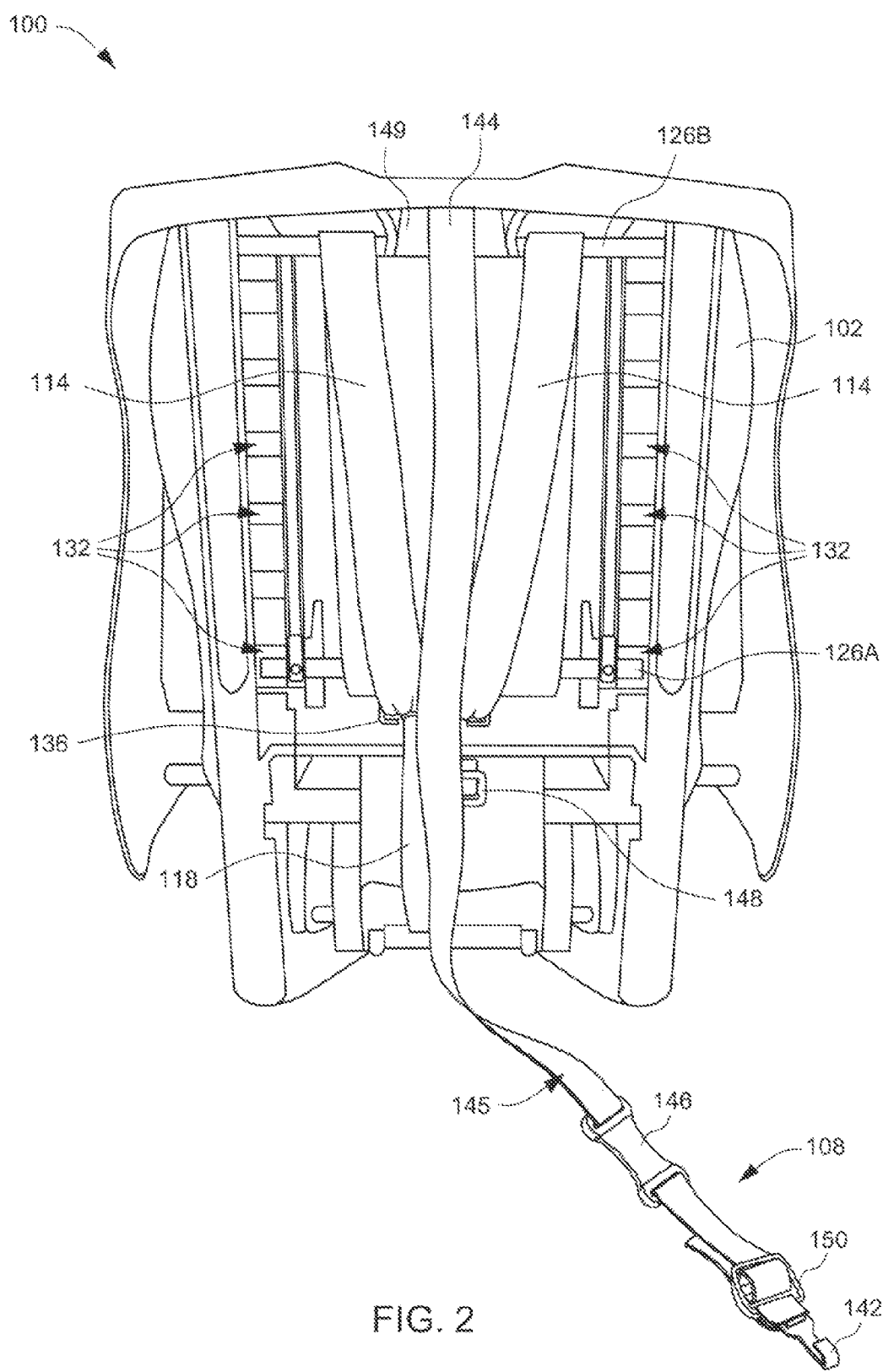
FIG. 2 is a schematic rear view of the child safety seat shown in FIG. 1.
Figure 3:
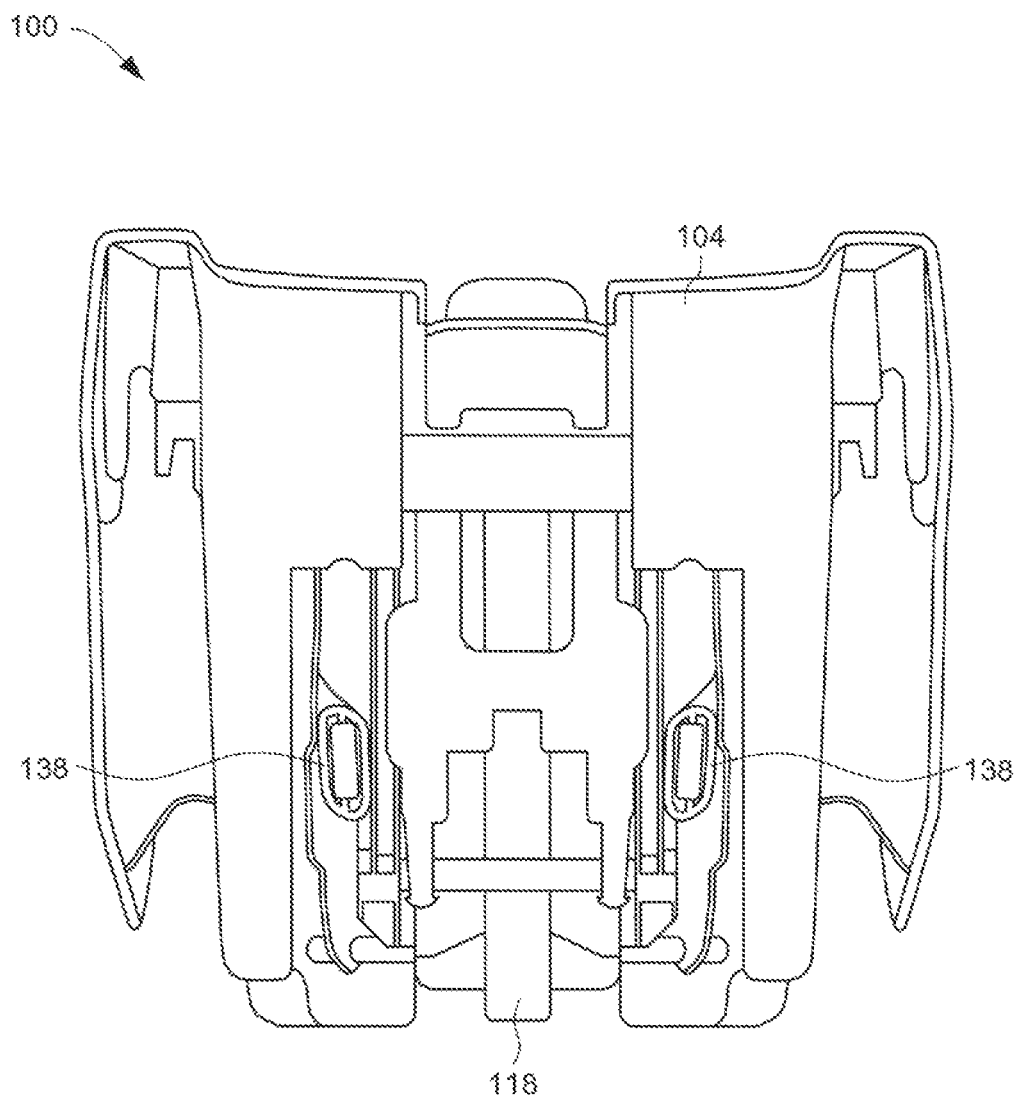
FIG. 3 is a schematic bottom view of the child safety seat shown in FIG. 1.

FIG. 1 is a perspective view illustrating one embodiment of a child safety seat 100, FIG. 2 is a schematic rear view of the child safety seat 100, and FIG. 3 is a schematic bottom view of the child safety seat 100. As shown in FIGS. 1 and 2, the child safety seat 100 can include a backrest 102, a seat portion 104, and a restrain harness 106 and a tether 108. The backrest 102 and the seat portion 104 can receive the placement of a child in a seating position. The backrest 102 can have a lower end portion joined with the seat portion 104, and left and right sides respectively connected left and right armrests 110 that are located above the seat portion 104.

The restrain harness 106 can exemplary include a crotch strap 112, a pair of shoulder straps 114, a pair of waist straps 116, an adjustment strap 118 and a buckle 119. The straps 112, 114 and 116 can be made of a web material. Once the child is installed on the child safety seat 100, the straps 112, 114 and 116 can be fastened together via the buckle 119 to restrain movement of the child and hold the child with the seat in case of collision.

In one embodiment, an upper surface of the seat portion 104 can have an opening 120 through which the crotch strap 112 can be installed, such that a first end of the crotch strap 112 can be fixed with an inner side of the seat portion 104, and a second end of the crotch strap 112 can extend outward and form a free end that can fasten with the buckle 119.

As shown in FIGS. 1 and 2, a front surface of the backrest 102 can include two openings 122 and 124. The two shoulder straps 114 can respectively travel from the front to the rear of the backrest 102 through the two openings 122 and 124, wrap around a transverse bar 126A on the rear of the backrest 102, extend upward toward another transverse bar 126B, wrap around the transverse bar 126B and extend downward, and eventually join with the adjustment strap 118. Accordingly, each of the shoulder straps 114 can have a first end anchored with the seat 100, and a free second end provided with a fastener tongue (not shown) that extends freely from the seat 100. After the child is installed on the child safety seat 100, the free end of the shoulder straps 114 can be fastened with the buckle 119. In one embodiment, each of the shoulder straps 114 can also include a flexible and soft pad 128 to provide comfortable contact. Chest clippers 130 can also be provided to connect and pull intermediary portions of the shoulder straps 114 toward each other for adequate positioning of the shoulder straps 114.

As shown in FIG. 2, the rear of the backrest 102 can include a plurality of locking slots 132 that may be distributed in two parallel and symmetric rows. The transverse bar 126A can engage with different pairs of the locking slots 132 to be held at different heights. As a result, the length of extension of the shoulder straps 114 wrapping around the transverse bar 126A can be modified, which can result in the adjustment of the height at which the shoulder straps 114 are extending from the front of the child safety seat 100.

Referring again to FIGS. 1 and 3, the adjustment strap 118 can travel through an opening 134 provided on a front region of the seat portion 104, extend at an underside of the seat portion 104 toward a rear of the seat portion 104. An end portion of the adjustment strap 118 proximate to a lower end of the backrest 102 can be affixed with a dual-hook fastener 136 through which the adjustment strap 118 can be detachably fastened with the two shoulder straps 114.

As shown in FIG. 3, each of the waist straps 116 can respectively extend downward through left and right side regions of the seat portion 104, such that a first end of each waist strap 116 can be attached with an anchor member 138, and a free second end of each waist strap 116 provided with a fastener tongue (not shown) can extend freely from the child safety seat 100.

Referring again to FIG. 2, the tether 108 can include a fastener 142, a strap 144, a resilient member 146 and an anchor latch 148. The strap 144 can have two opposite ends respectively connected with the fastener 142 and the anchor latch 148. The anchor latch 148 can be affixed with a lower rear region of the backrest 102 to securely hold the first end of the strap 144 with the child safety seat 100. The strap 144 can extend upward from the position of the anchor latch 148 toward a top region of the backrest 102, wrap around a guide member 149 (e.g., formed by a slot) provided at the top region of the backrest 102, and then vertically drop downward freely. As a result, a portion of the strap 144 between the anchor latch 148 and the guide member 149 can be restrained at the rear of the backrest 102, and the second end of the strap 144 can freely extend at the rear of the backrest 102 to form a free end portion 145 provided with the fastener 142. In one embodiment, the fastener 142 can be formed as a hook that can attach with a fixed anchor point external to the child safety seat 100.

In one embodiment, the resilient member 146 can be formed as an integral part by molding. The resilient member 146 can be made of an elastic material, for example rubber or thermoplastic polyester elastomer (TPEE), such as the TPEE commercialized under the trademark Hytrel® from E.I. du Pont de Nemours and Company. The resilient member 146 has an elasticity that differs from that of the strap 144. In one embodiment, the resilient member 146 can be connected with any locations of the strap 144 between the fastener 142 and the anchor latch 148. However, for providing effective cushioning results, the resilient member 146 can be disposed proximate to the free end portion 145 of the strap 144, i.e., after the guide member 149. Accordingly, when the vehicle is subject to a frontal collision or suddenly brakes, the resilient member 146 can deform to cushion the retaining force exerted by the tether 108.

In addition, the tether 108 can also include a length adjustment member 150 operable to adjust the length of the free end portion 145 of the strap 144.

Figure 4:
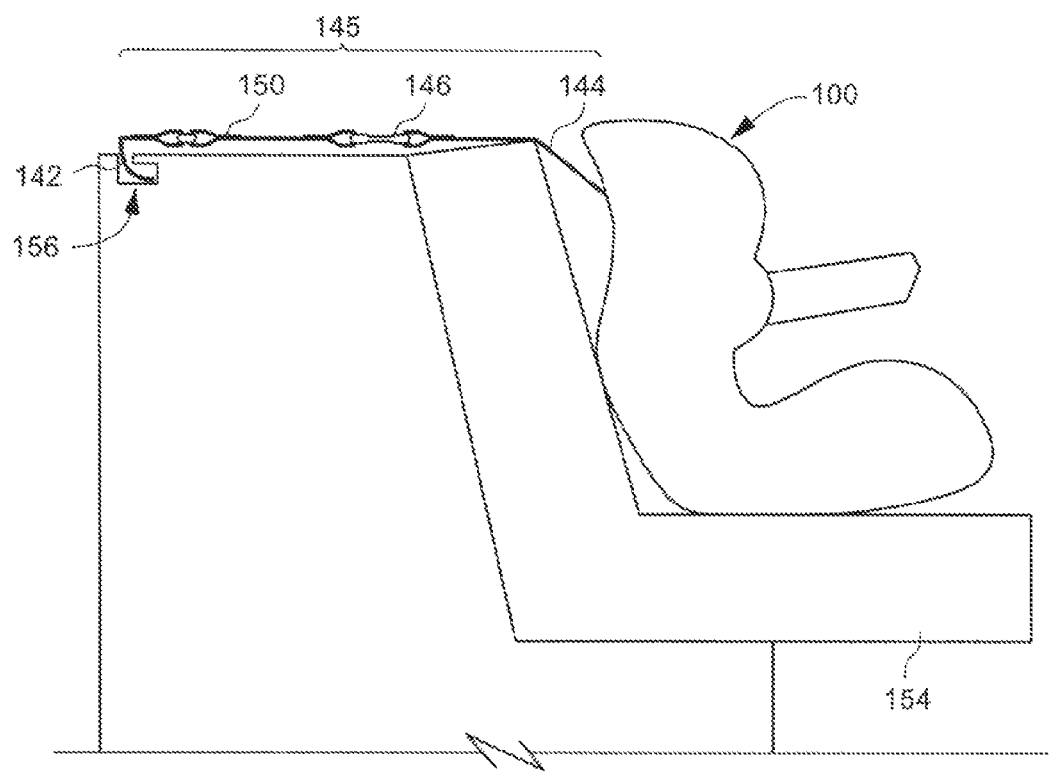
FIG. 4 is a schematic view illustrating the installation of the child safety seat on a rear seat of a vehicle.

FIG. 4 is a schematic view illustrating the installation of the child safety seat 100 on a passenger seat 154 of a vehicle. Once the child safety seat 100 is installed on the passenger seat 154, the free end portion 145 of the tether 108 can be extended rearward from the top of the backrest 102, and the fastener 142 then can be attached with a fixed anchor point 156 at a rear of the passenger seat 154 (e.g., provided on a parcel shelf behind the passenger seat 154). When the vehicle is subject to a frontal collision or suddenly brakes, the free end portion 145 can hold on the anchor point 156 to retain the top of the child safety seat 100 against forward displacement caused by the inertia of the child safety seat 100. More specifically, the strap 144 can tension and cause the resilient member 146 to stretch. This resulting deformation of the resilient member 146 can cushion the tensioning of the strap 144, such that the retaining force applied on the child safety seat 100 (in particular the top region of the seat 100) can be more progressive to reduce the risk of injuries of the child. Examples of the constructions of the resilient member of the tether 108 are described hereafter with reference to FIGS. 5-13.

Figure 5:
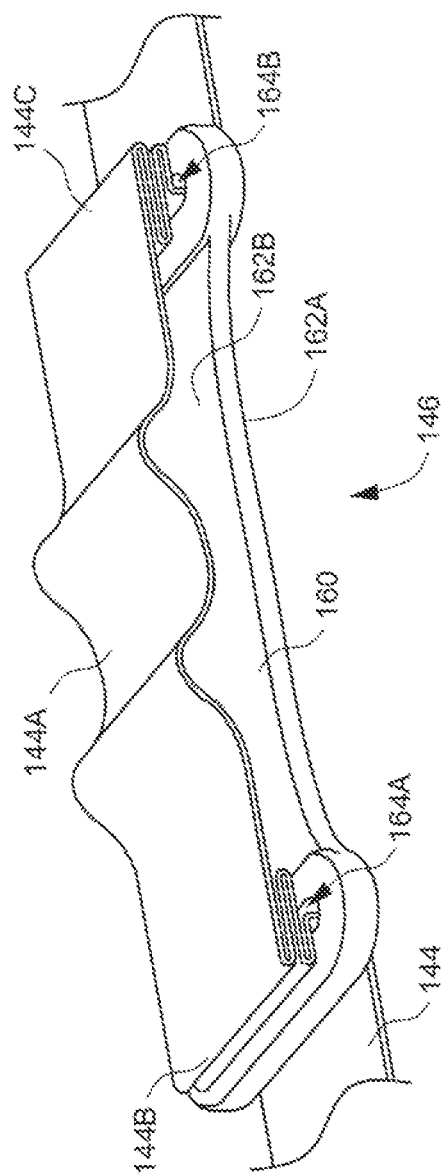
FIG. 5 is a perspective view illustrating a first embodiment of a resilient member used in the tether shown in FIG. 1.
Figure 6:
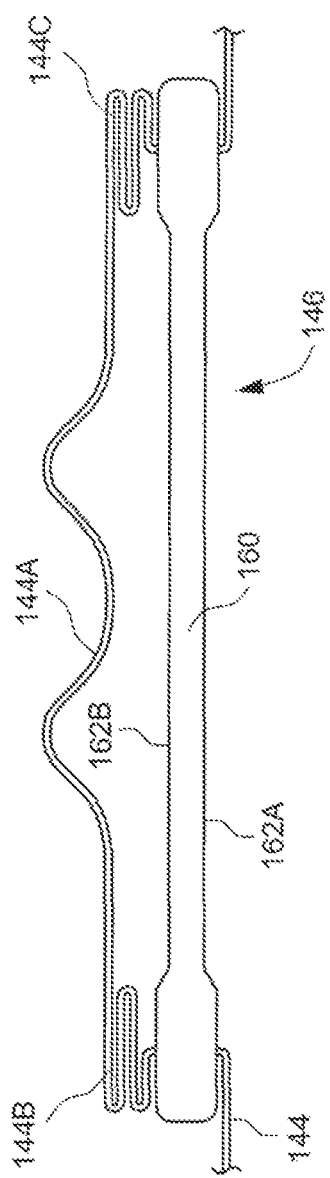
FIG. 6 is a schematic side view of the embodiment shown in FIG. 5.

FIG. 5 is a perspective view illustrating a first embodiment of the resilient member used in the tether 108, and FIG. 6 is a schematic side view of the embodiment shown in FIG. 5. As shown, the resilient member 146 can have a flat and elongated body 160. The body 160 can have opposite first and second surfaces 162A and 162B, and first and second slots 164A and 164B provided at two opposite ends of the length of the body 160. The strap 144 can pass through the first and second slots 164A and 164B, and extend along the resilient member 146. For example, the strap 144 can travel from the first surface 162A through the first slot 164A to the second surface 162B, extend along the second surface 162B toward the second slot 164B, and then pass from the second surface 162B through the second slot 164B to the first surface 162A.

Moreover, the strap 144 can include a slack portion 144A adjacent to the second surface 162B of the resilient member 146, and two anchor portions 144B and 144C at the positions of the first and second slots 164A and 164B. The anchor portions 144B and 144C can be located on the side of the second surface 162B, and the slack portion 144A can be located between the anchor portions 144B and 144C. In one embodiment, each of the anchor portions 144B and 144C can exemplary be formed by locally sewing a fold of the strap 144 to form a thick tab that is larger than each the slots 164A and 164B, whereby the strap 144 is prevented from sliding through the slots 164A and 164B.

When the vehicle is subject to a frontal collision or suddenly brakes, the inertia of the child safety seat 100 can cause the strap 144 to tension. The tensioned strap 144 in turn causes the resilient member 146 to deform and stretch to provide cushioning action.

Figure 7:
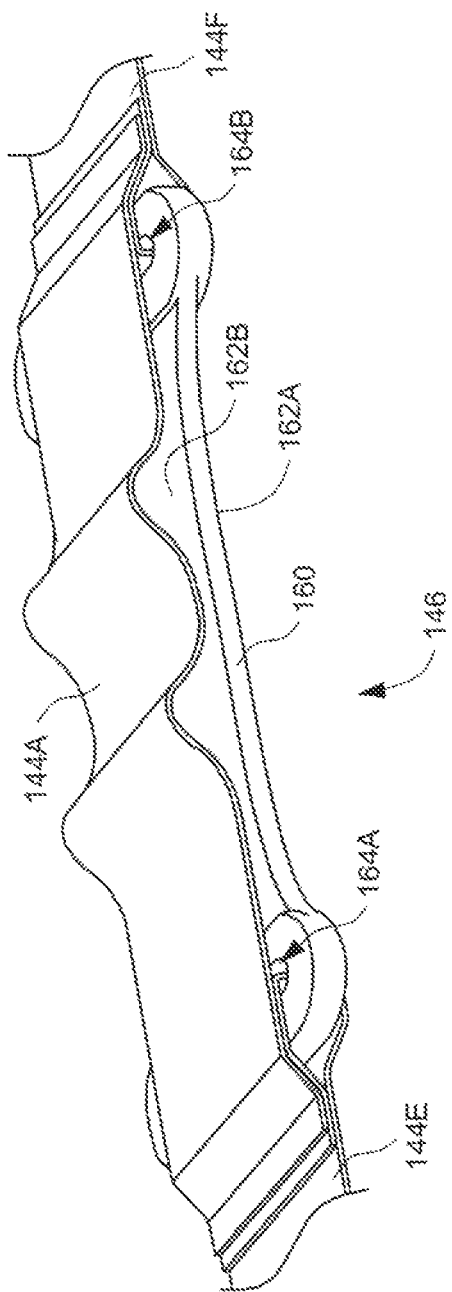
FIG. 7 is a perspective view illustrating a variant embodiment of the construction shown in FIG. 5.
Figure 8:
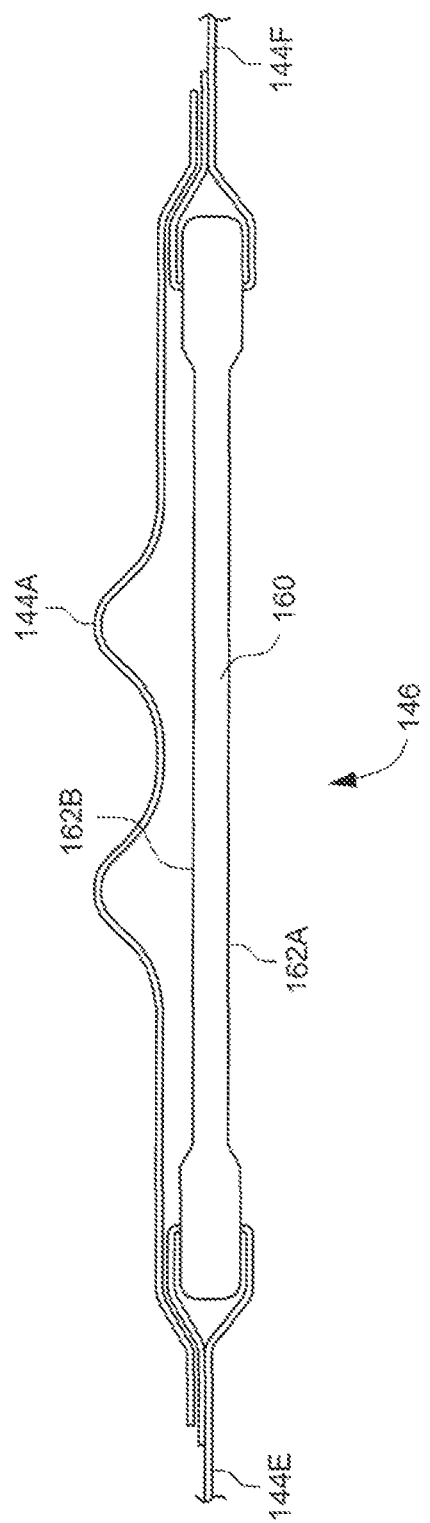
FIG. 8 is a schematic side view illustrating the variant embodiment of FIG. 7.

FIG. 7 is a perspective view illustrating a variant embodiment of the construction shown in FIG. 5, and FIG. 8 is a schematic side view illustrating the variant embodiment of FIG. 7. As shown, the strap 144 of this variant embodiment can be divided into two strap portions 144E and 144F. The strap portions 144E and 144F can respectively loop through the first and second slots 164A and 164B, and then respectively sewed to affix with the two opposite ends of the resilient member 146. The slack portion 144A can be connected between the strap portions 144E and 144F. The variant embodiment shown in FIGS. 7 and 8 can operate in a same manner as the embodiment of FIGS. 5 and 6.

Figure 9:
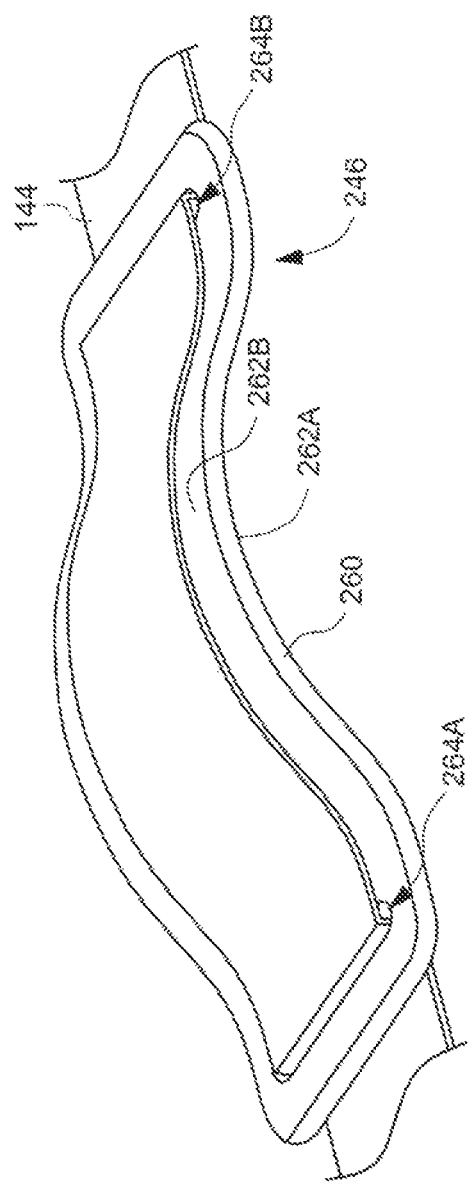
FIG. 9 is a perspective view illustrating another embodiment of a resilient member used in the tether.
Figure 10:
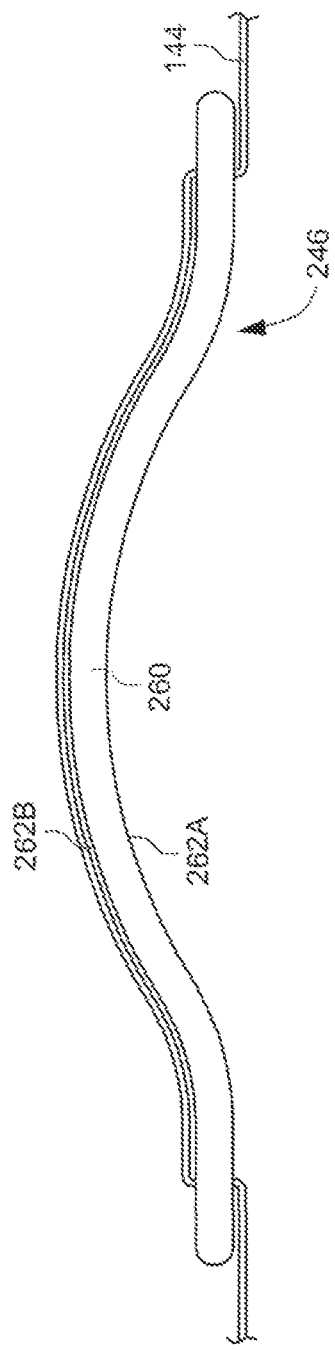
FIG. 10 is a schematic side view of the resilient member shown in FIG. 9.

FIG. 9 is a perspective view illustrating another embodiment of a resilient member 246, and FIG. 10 is a schematic side view of the resilient member 246. Like previously described, the resilient member 246 can be assembled with the strap 144. The resilient member 246 can have a body 260 of an arc shape. The body 260 can have opposite first and second surfaces 262A and 262B, and first and second slots 264A and 264B provided at two opposite ends of the length of the body 260. The strap 144 can travel from the first surface 262A through the first slot 264A to the second surface 262B, extend along the arc-shaped second surface 262B, and then travel from the second surface 262B through the second slot 264B to the first surface 262A.

Figure 11:
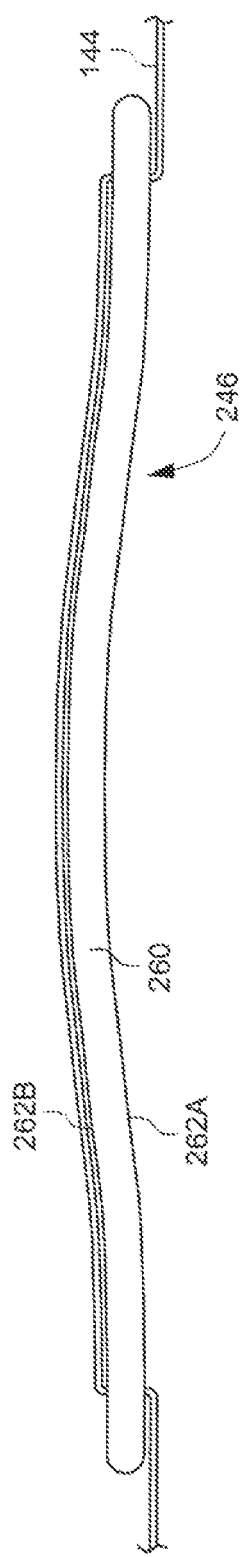
FIG. 11 is a schematic view illustrating the resilient member of FIG. 9 in a deformed state.

FIG. 11 is a schematic view illustrating the resilient member 246 in a deformed state. When the vehicle is subject to a frontal collision or suddenly brakes, the inertia of the child safety seat 100 can cause the strap 144 to tension. In turn, the tensioned strap 144 causes the resilient member 246 to deform and stretch to provide cushioning action. Because the strap 144 is movably wrapped through the slots 264A and 264B, the tensioned strap 144 can tightly push against the second surface 262B, which causes the body 260 to deform from an arc-shape state toward a flat-shape state.

Figure 12:
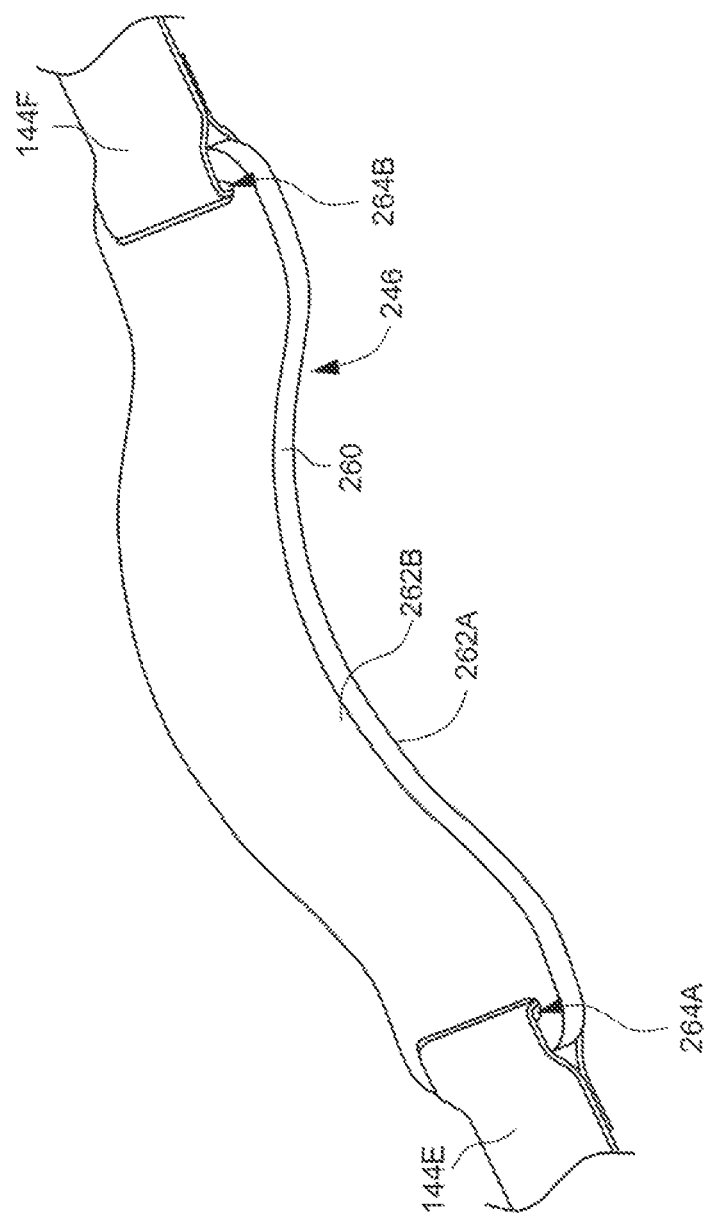
FIG. 12 is a perspective view illustrating a variant embodiment of the construction shown in FIG. 9.
Figure 13:
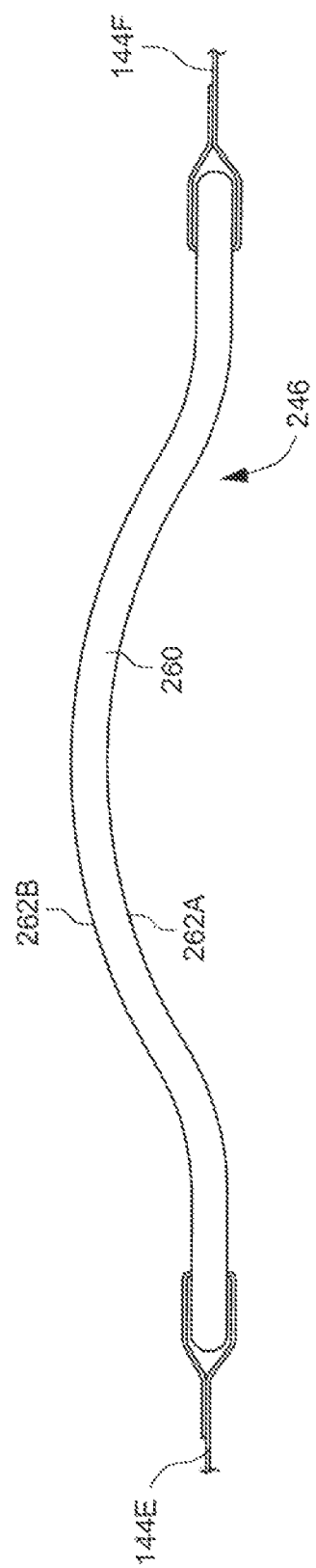
FIG. 13 is a schematic side view of the embodiment shown in FIG. 12.
Figure 14:
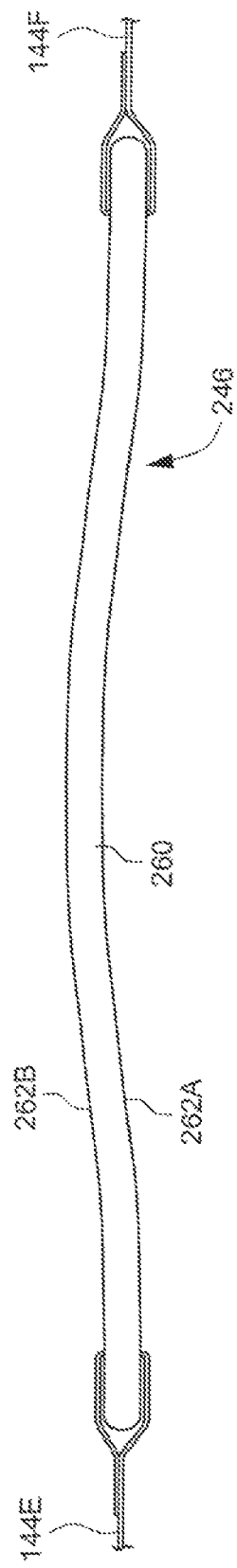
FIG. 14 is a schematic view illustrating the resilient member of FIG. 12 in a deformed state.

It is worth noting that the resilient member 246 can be connected with the strap 144 according to different ways. As shown in FIGS. 12 and 13, the strap 144 can be divided into two strap portions 144E and 144F. The strap portions 144E and 144F can respectively loop through the first and second slots 264A and 264B, and then respectively sewed to affix with the two opposite ends of the resilient member 246. As shown in FIG. 14, when the vehicle is subject to a frontal collision or suddenly brakes, the inertia of the child safety seat 100 can cause the strap portions 144E and 144F to tension and pull on the two opposite ends of the resilient member 246. As a result, the resilient member 246 can deform and provide cushioning.

Aside the tether 108, it will be appreciated that the resilient members described above may also be used in association with any of the crotch strap, shoulder strap, and waist strap to provide a cushioning function. For example, the pad 128 provided on the shoulder strap may also be replaced with the resilient member. In this case, the resilient member can provide a protective and cushioning functions.

The child safety seat described herein can have a tether that can operate in a more flexible manner. When the vehicle is subject to a frontal collision or suddenly brakes, the resilient member can deform and cushion the retaining force exerted by the tether, which can reduce the risk of injuries.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child safety seat comprising:
    a backrest;
    a seat portion connected with a lower end portion of the backrest; and
    a tether including a strap held with the child safety seat, and a resilient member assembled with the strap and having a body of an elongated shape provided with first and second slots at two opposite ends, the strap passing through the first and second slots and having first and second anchor portions that are respectively adjacent to the first and second slots, a slack portion of the strap extending between the first and second anchor portions, the first and second anchor portions being adapted to respectively obstruct the first and second slots to prevent the strap from sliding through the first and second slots; wherein the resilient member and the strap have different elasticity, and a tensioning of the strap causes deformation of the resilient member.

2. The child safety seat according to claim 1, wherein the first and second anchor portions are adapted to prevent sliding of the strap through the first and second slots in any direction that reduces the slack portion.

3. The child safety seat according to claim 1, wherein the resilient member is stretched when the strap is tensioned.

4. The child safety seat according to claim 1, wherein the resilient member is made of a rubber or thermoplastic polyester elastomer.

5. The child safety seat according to claim 1, wherein the strap has an end portion affixed with the child safety seat, and a free end portion provided with the resilient member.

6. The child safety seat according to claim 5, wherein the tether has a length adjustment member operable to modify a length of the free end portion.

7. The child safety seat according to claim 1, wherein the elongated shape of the resilient member has a first and a second outer surface opposite to each other and extending from the first slot to the second slot, and the slack portion extends continuously along the side of the first outer surface.

8. The child safety seat according to claim 7, wherein the first and second anchor portions are disposed at the side of the first outer surface.

9. The child safety seat according to claim 1, wherein the strap is affixed with the child safety seat, extends toward a top portion of the backrest, wraps about a guide member provided at the top portion, and has a free end portion that is provided with the resilient member and extends freely from the guide member at a rear of the backrest.

10. The child safety seat according to claim 9, wherein the free end portion has a fastener through which the tether is adapted to attach with a fixed anchor point external to the child safety seat.

11. The child safety seat according to claim 10, wherein the fastener is a hook.

12. A tether adapted for use with a child safety seat, the tether comprising a strap for being held with the child safety seat, and a resilient member connected with the strap and having a body of an elongated shape provided with first and second slots at two opposite ends, the strap passing through the first and second slots and having first and second anchor portions that are respectively adjacent to the first and second slots, an intermediate portion of the strap extending between the first and second anchor portions, the first and second anchor portions being adapted to respectively obstruct the first and second slots to prevent the strap from sliding through the first and second slots, wherein the resilient member and the strap have different elasticity, and a tensioning of the strap causes deformation of the resilient member.

13. The tether according to claim 12, wherein the intermediate portion is a slack portion of the strap extending between the first and second anchor portions.

14. The tether according to claim 12, wherein the elongated shape of the resilient member has a first and a second outer surface opposite to each other and extending from the first slot to the second slot, and the intermediate portion extends continuously along the side of the first outer surface.

15. The tether according to claim 14, wherein the first and second anchor portions are disposed at the side of the first outer surface.

16. A child safety seat comprising:

a backrest;

a seat portion connected with a lower end portion of the backrest; and a tether including a strap held with the child safety seat, and a resilient member assembled with the strap and having a body of an elongated shape provided with a first and a second slot spaced apart from each other along the elongated shape, the strap passing through the first and second slots and including first and second anchor portions respectively adjacent to the first and second slots, an intermediate portion of the strap extending along the resilient member between the first and second anchor portions, the first and second anchor portions being adapted to prevent the strap from sliding through any of the first and second slots away from a portion of the resilient member located between the first and second slots;

wherein the resilient member and the strap have different elasticity, and a tensioning of the strap causes deformation of the resilient member.

17. The child safety seat according to claim 16, wherein the strap has an end portion affixed with the child safety seat, and a free end portion provided with the resilient member.

18. The child safety seat according to claim 16, wherein the resilient member is stretched when the strap is tensioned.

19. The child safety seat according to claim 16, wherein the resilient member is made of a rubber or thermoplastic polyester elastomer.

20. The child safety seat according to claim 16, wherein the elongated shape of the resilient member has a first and a second outer surface opposite to each other and extending from the first slot to the second slot, the intermediate portion extends continuously along the side of the first outer surface, and the first and second anchor portions are disposed at the side of the first outer surface.

\* \* \* \* \*